(12) United States Patent
Schoellhammer et al.

(10) Patent No.: US 12,345,333 B2
(45) Date of Patent: Jul. 1, 2025

(54) METHOD FOR PRODUCING A FUNCTIONAL ELEMENT FOR FLAT SEALS AND FUNCTIONAL ELEMENT FOR FLAT SEALS

(71) Applicant: ElringKlinger AG, Dettingen (DE)

(72) Inventors: Jochen Schoellhammer, Dettingen (DE); Florian Hassler, Dettingen (DE)

(73) Assignee: ElringKlinger AG, Dettingen (DE)

( * ) Notice: Subject to any disclaimer, the term of this patent is extended or adjusted under 35 U.S.C. 154(b) by 1552 days.

(21) Appl. No.: 15/245,960

(22) Filed: Aug. 24, 2016

(65) Prior Publication Data

US 2016/0363223 A1 Dec. 15, 2016

Related U.S. Application Data

(63) Continuation of application No. PCT/EP2015/053593, filed on Feb. 20, 2015.

(30) Foreign Application Priority Data

Feb. 25, 2014 (DE) ............... 10 2014 102 462.1
Apr. 24, 2014 (DE) ............... 10 2014 105 806.2

(51) Int. Cl.
  *F16J 15/12* (2006.01)
  *F16J 15/06* (2006.01)
  *F16J 15/10* (2006.01)

(52) U.S. Cl.
  CPC ......... *F16J 15/126* (2013.01); *F16J 15/064* (2013.01); *F16J 15/104* (2013.01); *F16J 15/108* (2013.01); *F16J 15/122* (2013.01)

(58) Field of Classification Search
  CPC ...... F16J 15/064; F16J 15/0812; F16J 15/102; F16J 15/104; F16J 15/0818; B32B 3/00;
  (Continued)

(56) References Cited

U.S. PATENT DOCUMENTS 2,222,058 A    11/1940  McMullen et al.
3,382,985 A  *  5/1968  Muehl ................ F16J 15/104
                                                          210/495

(Continued)

FOREIGN PATENT DOCUMENTS

CA    2361761 A1    8/2000
DE   19904185 A1    8/2000

(Continued)

OTHER PUBLICATIONS

Polyester datasheet, Polymer Database, poly.chemnetbase.com (Year: 2016).*

(Continued)

*Primary Examiner* — Jennifer A Steele

(74) *Attorney, Agent, or Firm* — Reinhart Boerner Van Deuren P.C.

(57) ABSTRACT

In order to improve a method for producing a functional element, in particular, for flat seals, wherein a functional material layer is provided with a sieve region in which through openings for the passage of a fluid lie exposed between threads of a woven or plaited fabric such that a best possible sealing round the sieve regions is enabled, it is proposed that the functional material layer is provided with a sealing region which is formed to be cross-sectionally impermeable, in which the through openings of the woven or plaited fabric are closed by the softening and compressing of a filling material filling the through openings.

25 Claims, 14 Drawing Sheets

(58) Field of Classification Search
CPC .. Y10T 428/215; Y10T 428/00; Y10T 442/10
See application file for complete search history.

(56) References Cited

U.S. PATENT DOCUMENTS

| | | | | |
|---|---|---|---|---|
| 4,817,969 | A * | 4/1989 | McDowell | B29C 45/0005 |
| | | | | 277/595 |
| 5,310,197 | A * | 5/1994 | Bruch | F16J 15/123 |
| | | | | 277/601 |
| 6,077,609 | A * | 6/2000 | Blong | B32B 7/10 |
| | | | | 428/412 |
| 2005/0056966 | A1* | 3/2005 | Bartlett | B01D 35/30 |
| | | | | 264/259 |
| 2008/0128993 | A1* | 6/2008 | Blakeley | F16J 15/064 |
| | | | | 277/312 |
| 2008/0248271 | A1* | 10/2008 | Erb | C09K 3/1028 |
| | | | | 428/219 |
| 2008/0280040 | A1* | 11/2008 | Barrall | F16J 15/104 |
| | | | | 427/256 |
| 2013/0161250 | A1 | 6/2013 | Szele et al. | |
| 2014/0090343 | A1* | 4/2014 | Egloff | B32B 15/02 |
| | | | | 55/487 |

FOREIGN PATENT DOCUMENTS

| | | |
|---|---|---|
| DE | 102007019946 A1 | 10/2008 |
| DE | 602005006196 T2 | 7/2009 |
| DE | 202010006768 U1 | 9/2010 |
| DE | 102010030072 A1 | 12/2011 |
| DE | 202011004993 U1 | 5/2012 |
| EP | 1610042 A1 | 12/2005 |
| WO | WO 2007/126978 A2 | 11/2007 |
| WO | WO 2008/135133 A1 | 11/2008 |

OTHER PUBLICATIONS

Polyethylene Plastic: Properties, Uses and Application, Omnexus, copyright SpecialChem 2020, https://omnexus.specialchem.com/selection-guide/polyethylene-plastic (Year: 2020).*
Shioya "Synthetic textile fibers and Non-Polymer Fibers", Tokyo Institute of Technology, copyright 2015 Elsevier (Year: 2015).*
Textile Glossary, Celanese Acetate, copyright 2001 (Year: 2001).*

* cited by examiner

METHOD FOR PRODUCING A FUNCTIONAL ELEMENT FOR FLAT SEALS AND FUNCTIONAL ELEMENT FOR FLAT SEALS

CROSS-REFERENCE TO RELATED PATENT APPLICATIONS

This application is a continuation of international application number PCT/EP2015/053593 filed on Feb. 20, 2015.

This patent application claims the benefit of International application No. PCT/EP2015/053593 of Feb. 20, 2015 and German applications No. 10 2014 102 462.1 of Feb. 25, 2014 and No. 10 2014 105 806.2 of Apr. 24, 2014, the teachings and disclosure of which are hereby incorporated in their entirety by reference thereto.

BACKGROUND OF THE INVENTION

The invention relates to a method for producing a functional element, in particular for flat seals, wherein a functional material layer is provided with a sieve region in which through openings for the passage of a fluid lie exposed between threads of a woven or plaited fabric.

A method of this type is known, for example, from DE 20 2011 004 993 U1.

In this known solution, for the production of a sealing round the sieve regions, it is provided that the threads themselves are deformed in the region of the crossing sites of the threads.

Although a deformation of the threads of this type improves the possibility of sealing round the sieve region, it does not provide any reliable durable cross-sectional impermeability round the sieve region since in the region of the crossing sites of the threads, gaps which negatively influence the impermeability still remain.

It is therefore an object of the invention to improve a method of this type in that a best possible sealing round the sieve regions is possible.

SUMMARY OF THE INVENTION

This object is achieved according to the invention with a method of the type described in the introduction in that the functional material layer is provided with a sealing region which is configured cross-sectionally impermeable, in which the through openings of the woven or plaited fabric are closed by the softening and compressing of a filling material filling the through openings.

Only by closing the through openings is a reliable and durable cross-sectional impermeability provided in the sealing region round the respective sieve region.

A further advantage of the solution according to the invention is that the filling material also brings about a stabilisation of the woven or plaited fabric, similarly to a fibre composite material, specifically a stabilisation of the position of the fibres relative to one another, which thus fixes the course of the fibres and creates a dimensionally stable structure which brings about a dimensional stability of the functional material layer, in particular, round the at least one sieve region.

Furthermore, with a correspondingly large extent of the sealing region, a stable flat form is created.

In particular, by means of such a structure of stable form, edge regions of the functional material layer can also be stably configured.

In this way, the positional accuracy of the sieve region and of the sealing region on installation of a functional element of this type is improved, as also is the long-term positioning behaviour.

Furthermore, the solution according to the invention provides the possibility, as before, of using the woven or plaited fabric as the basis for the formation of the sealing region so that, in particular, the transition from the sieve region to the sealing region is easily creatable since, starting from the woven or plaited fabric as the starting material, only in the sealing region must the through openings be closed with the filling material, whilst in the simplest case, the sieve region can be formed by the woven or plaited fabric itself without any influence on the woven or plaited fabric or a treatment of the woven or plaited fabric in the sieve region being required.

Rather, the woven or plaited fabric can be selected so that it has the required properties for the formation of the sieve region and only then does a closing of the through openings in the sealing region take place.

The sealing region does not herein extend exclusively round the respective sieve region, rather it is also conceivable, for example, to use such a sealing region to seal round an aperture through the functional material layer, wherein the aperture can be used either for connecting elements or for fluid passages without a sieve or a filter function.

In the event that the threads have sufficient material, it is conceivable, for example, in one solution that in the sealing region the threads are softened and the softened material of the threads serves as the filling material with which the through openings are closed.

This means that in this case, the threads make at least part of the filling material available for closing the through openings or make the entire filling material available for closing the through openings.

In order to have sufficient filling material, in particular, also in the case of thin threads, it is preferably provided that filling material is applied onto the woven or plaited fabric and the softened filling material is compressed in order to close the through openings.

In this event, it is, for example, conceivable to apply the filling material already in the softened state and then only to compress the softened filling material.

The filling material can be produced, for example, in the softened, that is, for example, a not cross-linked or partially cross-linked state and in this state applied onto the woven or plaited fabric, then compressed and, subsequently a transition into the no longer softened state takes place.

In this no longer softened state, the filling material is then still elastically deformable.

Another advantageous solution provides that the filling material closing the through openings is applied or laid onto the woven or plaited fabric and, following the softening is pressed into the woven or plaited fabric.

This means that in this case, the filling material is applied or laid in a not yet softened state onto the woven or plaited fabric and only then does the softening and compressing of the filling material take place.

For example, it is conceivable in this case to apply the filling material as a powder or as a solid layer or film to the woven or plaited fabric in the sealing region and then soften it, in order then to compress it to close the through openings.

It is herein particularly favourable if by means of the compressing of the softened filling material, the through openings of the woven or plaited fabric are closed and also space regions of the woven or plaited fabric surrounding the threads are filled.

This means that in this case, not only are the through openings closed by the filling material, but the space regions adjoining the threads, in particular, adjacent to crossing points are filled.

In this way, gaps or hollow spaces which can impair the cross-sectional impermeability in the sealing region can be prevented to the greatest extent.

It is particularly favourable for a durable closing of the through openings if the filling material is compressed so that it permeates the through openings.

In order to enable an optimum possible sealing of the functional element in the sealing region, it is preferably provided that by means of the compressing of the softened filling material on both sides of the woven or plaited fabric, a sealing surface suitable for sealing against a contact surface is formed.

A sealing surface of this type is formed, for example, so that it has a surface roughness which is smaller than a thread thickness, or better, smaller than half of a thread thickness and preferably smaller than a tenth of a thread thickness.

In particular, it is advantageous if the surface roughness is less than 20 µm, or better, less than 10 µm.

Thus, sufficiently precise sealing surfaces are available in order to be able to realise a sealing of the functional element in durable manner with simple means.

In particular, it is therein provided that the respective sealing surface is formed for sealing against a contact surface of an assembly of inelastic height.

This means that the surface quality of the sealing surface is so good that the low elasticity of the sealing region is sufficient to achieve a sufficiently good sealing against a contact surface of an assembly of inelastic height.

With regard to the selection of the filling material, it has so far only been stipulated that it should be softenable and, compressed, should be pressable into the woven or plaited fabric.

A filling material of this type could be, for example, a filling material which can be softened by means of a solvent and can then be compressed.

A particularly favourable solution provides, however, that a thermoplastic material which is softenable or liquefiable in an easy manner by heating, is used as the filling material.

With regard to the configuration of the threads themselves, so far no detailed information has been given.

An advantageous solution provides that the threads have a thread thickness of not more than 300 µm, but it is better if the threads have a thread thickness of not more than 200 µm and still better, a thread thickness of not more than 100 µm, and particularly preferably, a thread thickness of not more than 50 µm, in order to be able to use a very fine woven or plaited fabric.

The threads can be, for example, metal threads and, in particular, it is conceivable to use stainless steel threads as the threads.

Another advantageous solution provides, however, that the woven or plaited fabric is formed from plastics threads.

Such plastics threads can be configured from highly diverse materials.

A particularly suitable solution provides that the woven or plaited fabric has threads of thermoplastic material, wherein the thermoplastic material of the threads is thermally softened and compressed as filling material to close the through openings.

In this case, therefore, to close the through openings, the filling material can be partially or entirely implemented by means of the softened portion of the material of the threads.

In another solution wherein, in particular, the woven or plaited fabric forms a stable base for the sealing region, it is preferably provided that the functional material layer is formed by a woven or plaited fabric of threads the melting point of which lies so far above the melting point of the thermoplastic material applied onto it that on softening of the applied thermoplastic material, no softening of the threads takes place.

In this case, therefore, the threads remain undeformed even on softening of the filling material and retain their mechanical properties in order thus to have a stable base for the sealing region and the transition between the sealing region and the sieve region, so that no thread breakages or other breakage phenomena occur at the transition from the sieve region to the sealing region.

With regard to the further configuration of the functional element, so far no detailed information has been given.

In principle, a functional element of this type with the previously defined features could be used as a flat seal.

However, it is particularly advantageous for the use of a functional element according to the invention as a flat seal if a sealing element is provided on at least one of the sealing surfaces.

A sealing element of this type serves, in particular acting as an element of elastic height, to produce a sealing to a contact surface of an assembly, wherein such a sealing element of elastic height serves, in particular, to bridge and therefore to close a gap between the sealing surface and the contact surface of the assembly, particularly when said gap varies over the extent of the gap.

For this reason it is provided, for example, that at least one of the sealing regions is provided with a sealing element of elastomer material.

An elastomer material of this type provides the possibility, in the usual manner, of bridging the gap elastically between the sealing surface and a contact surface of the assembly.

An elastomer layer of this type can be applied, for example, subsequently after formation of the sealing surfaces.

A particularly advantageous solution with regard to the production provides that the sealing element of elastomer material is placed, together with a film comprising the filling material, onto the woven or plaited fabric, wherein particularly in this case, it is provided that on softening of the film, the elastomer layer undergoes no shape change, so that the elastomer layer is present unchanged when the filling material is pressed into the woven or plaited fabric. In a particular embodiment, the elastomer material has a softening temperature which is so far above a softening temperature of the filling material that the sealing element is of unchanged form following a thermal softening of the filling material.

Preferably, the elastomer layer is made of a thermosetting plastics material and is therefore not thermally softenable.

Another advantageous solution provides that at least one layer made of a metallic flat material is provided on the at least one sealing surface as a sealing element.

It is preferably provided therein that the at least one layer of metallic flat material is provided with at least one seal element, wherein a seal element of this type can be configured, for example, as an elastomer support or a bead.

The invention further relates to a functional element, in particular for flat seals comprising a functional material layer with a sieve region in which through openings for the passage of a fluid are arranged exposed between threads of a woven or plaited fabric, wherein according to the invention, in a sealing region configured to be cross-sectionally impermeable, the through openings of the woven or plaited fabric are filled by a filling material and are thereby closed.

The advantage of the solution according to the invention is to be found therein that a cross-sectionally impermeable configuration of the sealing region can be realised in a simple manner.

In addition, in such a functional element, the filling material causes a stabilisation of the fabric, as described in the introduction, in relation to a method according to the invention.

For example, it is herein conceivable that the filling material comprises material of the threads wherein the filling material can be either exclusively or at least partially formed of the material of the threads.

Furthermore, it is preferably provided that a filling material supplemental to the woven or plaited fabric is pressed into the woven or plaited fabric.

Herein, the filling material supplemental to the woven or plaited fabric can serve exclusively to fill the through openings so that the threads of the woven or plaited fabric retain their form unaltered or material of the threads of the woven or plaited fabric can also be used at least partially as a filling material.

It is preferably further provided that the filling material closing the through openings is formed by a layer of supplemental filling material pressed into the woven or plaited fabric.

It is particularly advantageous for the cross-sectional impermeability in the sealing region if the compressed filling material closes the through openings of the woven or plaited fabric and fills space regions of the woven or plaited fabric adjoining the threads.

In this way, not only are the through openings closed, but space regions adjoining the threads, in particular adjoining crossing sites of the threads, are also filled with the filling material.

It is particularly favourable if the filling material permeates the through openings in order thus to achieve an optimum cross-sectional impermeability in the region of the through openings.

In order to enable the functional element according to the invention to seal optimally against contact surfaces of further assemblies, it is preferably provided that, on both sides of the woven or plaited fabric, the pressed in filling material forms a sealing surface suitable for sealing against a contact surface.

A sealing surface of this type is preferably a sealing surface with a low surface roughness of less than 20 μm, or better, less than 10 μm.

In particular, it is advantageous if the respective sealing surface is configured for sealing against a contact surface of an assembly of inelastic height, that is, having a sufficiently good surface quality in order to ensure an optimum sealing against a contact surface of this type.

With regard to the formation of the filling material, so far no detailed information has been given.

It is thus conceivable to form the filling material as a material that is softenable with a solvent.

Another advantageous solution provides, however, that the filling material is a thermoplastic material.

Furthermore, with regard to the configuration of the woven or plaited fabric, so far no detailed information has been given.

It is particularly favourable if the threads of the woven or plaited fabric have a thread thickness of not more than 300 μm, or better, not more than 200 μm, still better, not more than 100 μm and in a special case, not more than 50 μm.

In principle, the woven or plaited fabric could be made of metal threads or threads of other materials such as, for example, ceramics.

A particularly favourable solution provides, however, that the woven or plaited fabric is formed from plastics threads.

In the case of plastics threads, it is preferably provided that the woven or plaited fabric has threads of thermoplastic material, wherein the thermoplastic material of the threads is at least partially compressed as a filling material to close the through openings.

This means that in this case, the material of the threads of the woven or plaited fabric can be used at least partially as a filling material to close the through openings.

If required, however, it is also conceivable to close the through openings without additional filling material with only part of the material of the threads of the woven or plaited fabric.

A further advantageous solution provides that the functional material layer is formed by a woven or plaited fabric of threads the melting point of which is so far above the melting point of the thermoplastic material applied onto it that the applied thermoplastic material is disposed in the through openings of the threads of unchanged form, that is, that the threads undergo no form change in this case and their material is not used as filling material, but only the additional filling material as thermoplastic material serves to close the through openings.

With regard to the further configuration of the functional element according to the invention, so far no detailed information has been given.

An advantageous solution provides to use the functional element itself without further additional elements as a flat seal, wherein the sealing surfaces are placed directly against contact surfaces of the assembly to be sealed.

Another advantageous solution provides that a sealing element is arranged on at least one of the sealing surfaces and serves to close a gap between the sealing surface and the contact surface of the assembly.

In this case, the sealing element is preferably configured as a sealing element of elastic height.

A solution for a sealing element of this type provides that a sealing element of elastomer material is arranged on at least one of the sealing surfaces.

Herein, for example, after production of the sealing surfaces, the elastomer material can be laid or applied thereon.

A particularly favourable solution provides that the elastomer material is formed of a thermally not softenable material, for example, a thermosetting plastics material, so that the sealing element is of unchanged form following a thermal softening of the filling material.

In this case, the possibility exists, for example, that the filling material and the sealing element are laid or applied simultaneously onto the woven or plaited fabric and then a thermal softening of the filling material takes place without the form of the sealing element being influenced thereby, so that also together with the sealing element, a compressing of the softened filling material into the woven or plaited fabric can take place.

Alternatively or additionally, in a further embodiment of the functional element according to the invention, it is provided that at least one of the sealing surfaces is provided as a sealing element with at least one layer made of a metallic flat material which is also configured as an element of elastic height and serves to seal the gap between the sealing surface and the locating side of an assembly.

In particular, it is provided therein that the at least one layer made of a metallic flat material is provided with seal elements, such as, for example elastomer supports or beads.

Further features and advantages of the invention are the subject matter of the following description and of the illustration in the drawings of some exemplary embodiments.

DETAILED DESCRIPTION OF THE INVENTION

Figure 1:
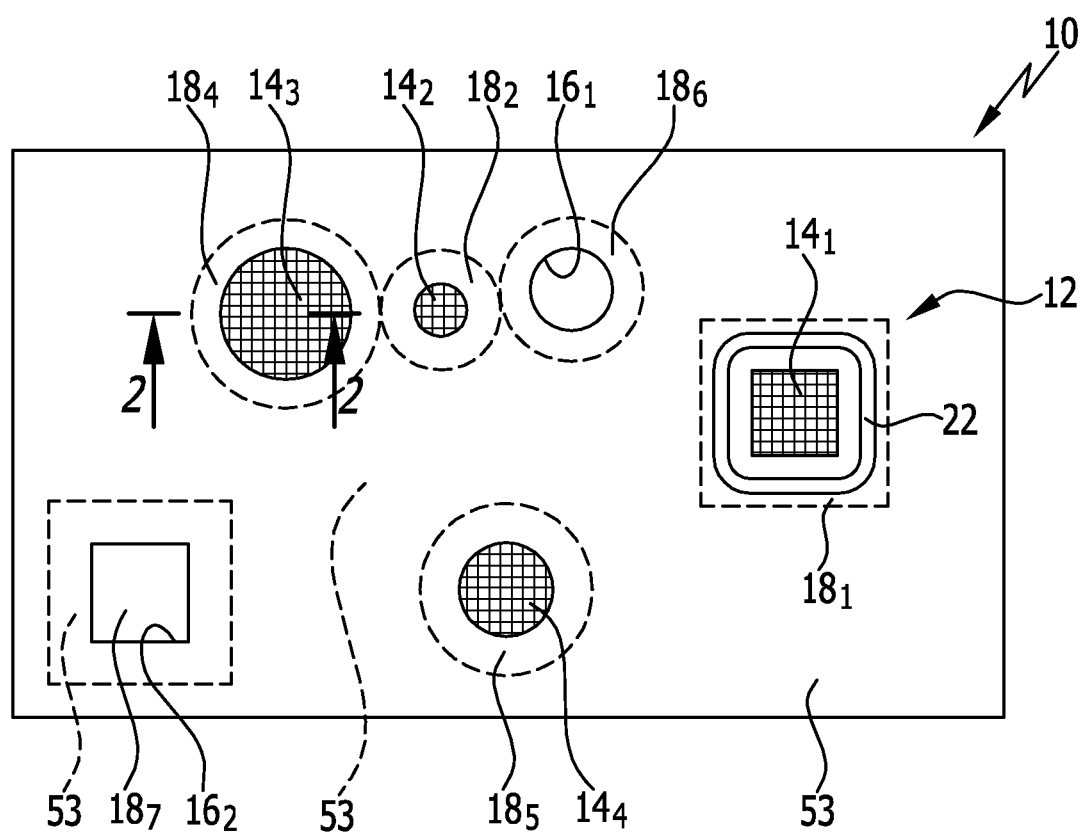
FIG. 1 shows a plan view of a first exemplary embodiment of a functional element according to the invention.

A first exemplary embodiment shown in FIG. 1 of a functional element 10 according to the invention comprises a functional material layer identified overall as 12 which has sieve regions $14_1$, $14_2$, $14_3$ and $14_4$ with which a filtration of a fluid passing through the functional material layer 12 takes place.

For example, in addition to the sieve regions 14, the functional material layer 12 can also have apertures $16_1$ and/or $16_2$, through which a fluid can pass unhindered.

The sieve regions 14 and the apertures 16 are preferably surrounded by sealing regions 18 in which the functional material layer 12 is formed to be cross-sectionally impermeable.

Herein, the sealing regions 18, as shown, for example, dashed in FIG. 1, can be the regions surrounding the respective sieve regions 14 or apertures 16 or the entire functional material layer 12 outside the sieve regions 14 and the apertures 16 can be configured as a continuous sealing region 18.

The sealing regions 18 can be configured so that they are placeable directly against an area to be sealed of a housing or a unit having fluid outlets and/or inlets.

For example, however, the functional layer 12 can also be configured so that in the sealing regions 18 it has sealing elements 22 which, for example, surround the respective sieve region 14 or the respective aperture 16 so as to be enclosed.

Figure 2:
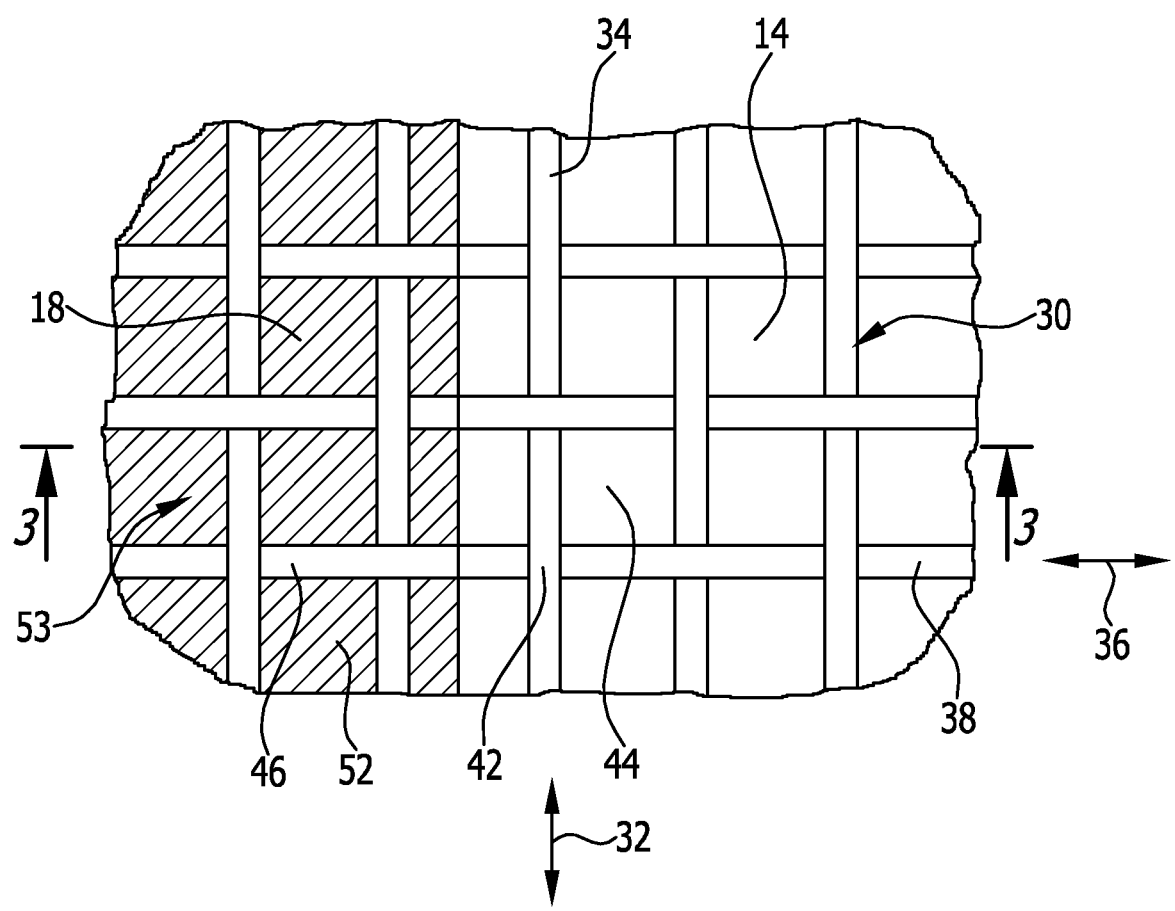
FIG. 2 shows a section along the line 2-2 in FIG. 1.

As FIG. 2 shows, the functional material layer 12 comprises a woven or plaited fabric of threads 34, identified overall as 30, arranged extending parallel to a first direction 32 and transversely to the second direction 36 at a spacing from one another, and second threads 38 extending parallel to a second direction 36 which extends transversely to the first direction 32 and arranged at a spacing from one another, wherein the threads 34 and 38 overlap and lie against one another at crossing sites 42 and also respectively enclose through openings 44, the extent of which is defined by the spacing of the first threads 34 from one another and the spacing of the second threads 38 from one another.

For example, the thickness of the threads 34, 38 lies in the range between 30 μm and 300 μm.

The woven fabric 30 extending in one of the sieve regions 14 thus provides, with its through openings 44 in the respective sieve region 14, the desired filter effect which is brought about in that only particles which have a smaller extent than the respective through openings 44 can pass through the through openings 44, whereas particles with a larger extent than the through openings 44 are held back.

In the functional material layer 12 according to the invention, the woven or plaited fabric 30 extends over the entire extent thereof as far as its outer edge regions and, in the sieve regions 14, with its through openings 44, forms the filter element for filtration of the fluid passing through, whilst the woven or plaited fabric 30 outside the sieve regions 14 forms a basic structure 46 for the sealing region 18.

Figure 3:
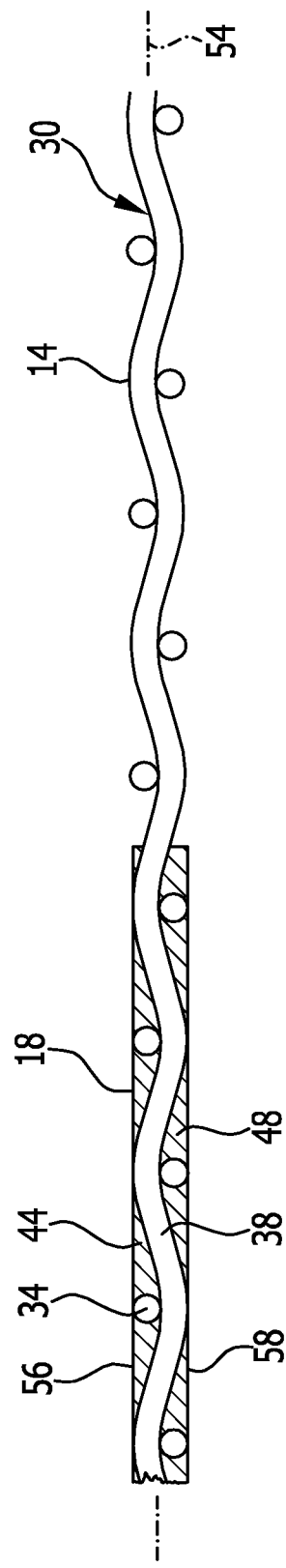
FIG. 3 shows a section along the line 3-3 in FIG. 2.

In the sealing region 18, however, the through openings 44 are closed, specifically for example, by a thermoplastic filling material 52 which, as shown in FIGS. 2 and 3, closes the through openings 42 in the sealing region 18 and moreover embeds the threads 34 and 38 of the woven or plaited fabric 30.

Thus, at least in the respective sealing region 18, a dimensionally stable structure 53 similar to a fibre composite material results.

This dimensionally stable structure 53 stabilises not only the sieve regions 14 surrounded by it, but also the woven or plaited fabric 30 overall, so that, for example, a dimensionally stable structure 53 of this type can be provided in all regions of the functional element 10 outside the sieve regions 14 and the apertures 16.

Such a dimensionally stable structure 53 can be provided at least close to the outer edge regions of the functional material layer 12.

With this dimensionally stable structure 53, it is possible that sealing surfaces 56 and 58 arise extending approximately parallel to a surface of extent 54 of the woven or plaited fabric 30, said sealing surfaces having a surface roughness which is smaller than 0.5 times a thickness of the threads 34, 38, or better, smaller than 0.1 times a thickness of the threads 34, 38.

Preferably, the surface roughness is less than 10 µm.

Thus, the sealing surfaces 56, 58 are arranged at a separation from one another transversely to their area extent, said separation preferably corresponding at least to the sum of the thickness of a thread 34 and the thickness of a thread 38, since these lie over one another at the crossing sites 42 and thus define the minimum separation of the sealing surfaces 56, 58 if no deformation of the threads 34, 38 is to take place.

The softened filling material 52 filling the through openings 44 and the regions lying laterally therefrom and the space regions 48 between the threads 34 and 38 as well as between the sealing surfaces 56, 58 is herein, for example, a thermoplastic material which can be formed relative to the woven or plaited fabric 30 so that this filling material 52 permeates and closes the through openings 44 and furthermore the space regions 48 adjoining the threads 34, 38 as far as the sealing surfaces 56, 58 so that the sealing surfaces 56, 58 can be formed with the aforementioned low surface roughness.

Figure 4:
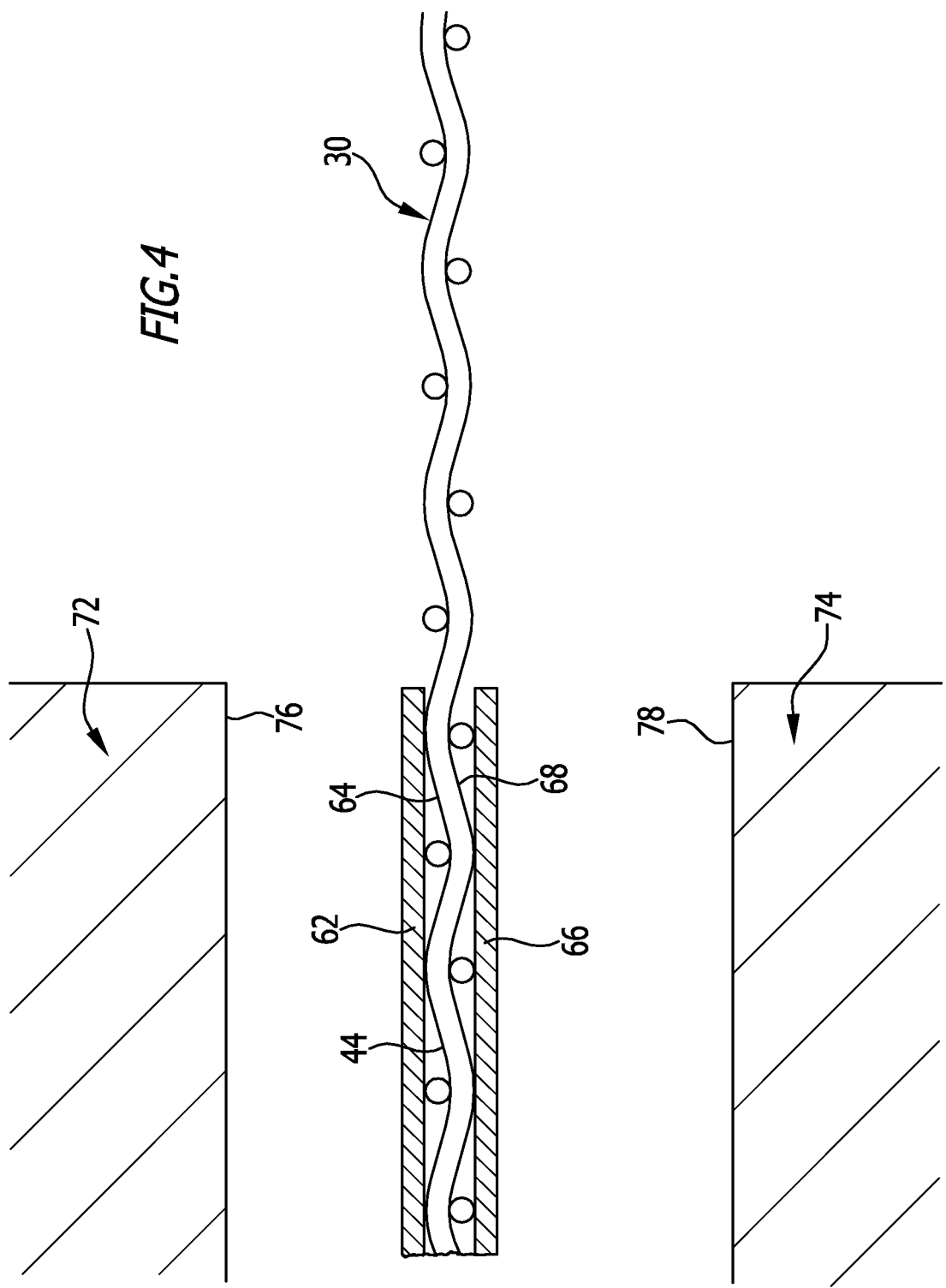
FIG. 4 shows a section similar to FIG. 3, which illustrates a placement of a layer of a filling material onto a woven or plaited fabric before a compression process with the pressing tools also shown in FIG. 4.

The application of a filling material 52 of this type takes place, as shown in FIG. 4, by the placement of a filling material film 62 onto a first side 64 of the woven or plaited fabric 30 and the placement of a filling material film 66 on a second side 68 of the plaited or woven fabric 30 situated opposite the first side 64, wherein the films 62, 66 of filling material 52 have a thickness which lies in the order of the thickness of the threads 34, 38, preferably somewhat less than the thickness of the threads 34 and 38.

The filling material can already be provided in the softened state in the filling material film 62, 66 in that it has been produced in the softened state and processed into the filling material film.

With a thermoplastic material as a filling material 52 of the filling material films, heating of the films 62 and 64 brings about a softening of the filling material 52 of thermoplastic material forming the films 62 and 66.

Through subsequent pressing of the softened filling material contained in the filling material films 62 and 66 by means of pressing tools 72 and 74 into the through openings 44, the through openings 44 and the space regions 48 round the threads 34 and 38 can be filled to the extent that a formation of the sealing surfaces 56 and 58 with the aforementioned low surface roughness takes place.

Herein, in particular, by means of suitably configured pressing surfaces 76, 78 of the pressing tools 72, 74, the sealing surfaces 56 and 58 can be formed with the desired low surface roughness.

The seal elements 22, for example, can then subsequently be applied or laid onto these sealing surfaces 56 and 58.

Figure 5:
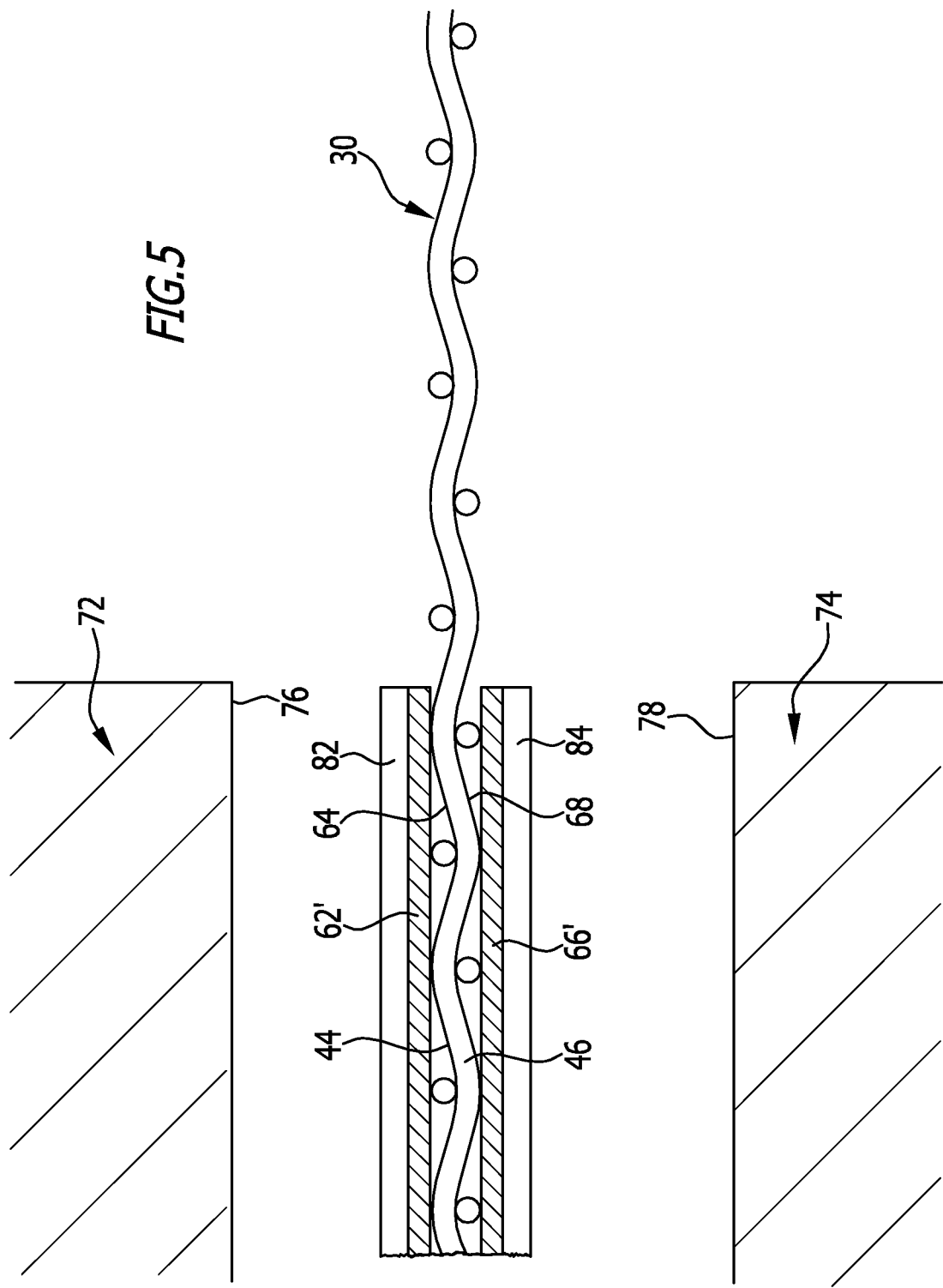
FIG. 5 shows a view similar to FIG. 4 of a second exemplary embodiment of a functional element according to the invention.
Figure 6:
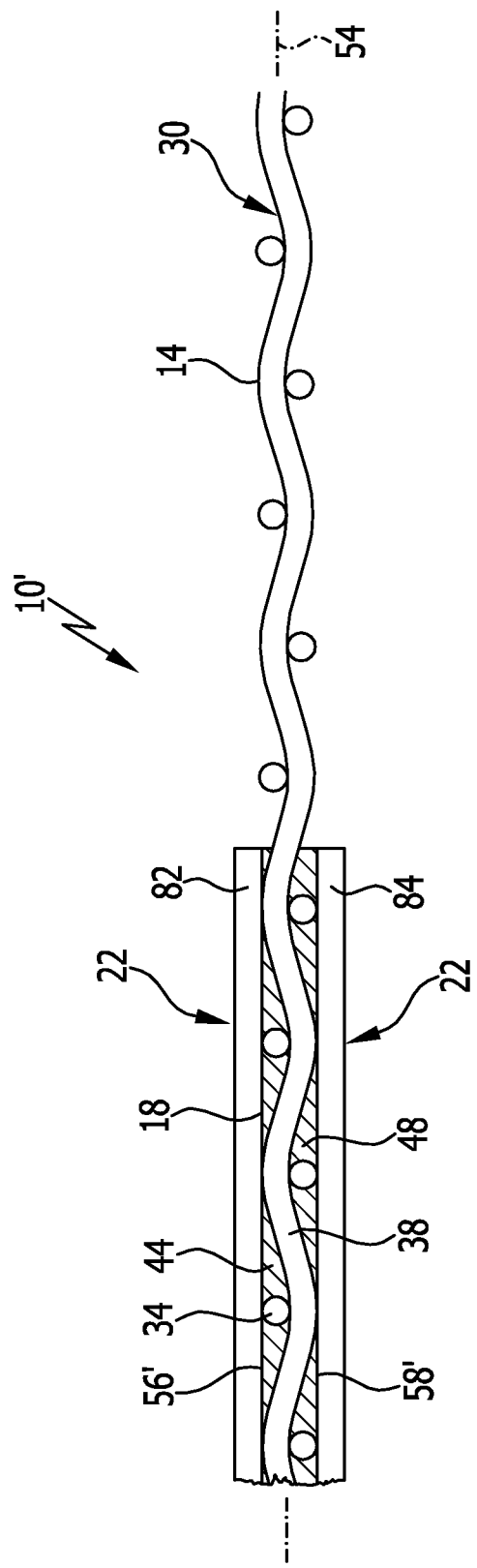
FIG. 6 shows a view similar to FIG. 3 of the second exemplary embodiment of the functional element according to the invention.

In a second exemplary embodiment of a functional element 10' according to the invention, illustrated in FIGS. 5 and 6, the films 62' and 66' made of the filling material 52 are already provided on their respective side facing away from the woven or plaited fabric 30 with an elastomer layer 82 or 84, wherein the elastomer layers 82, 84 have a greater thermal resistance than the filling material 52 of the films 62' and 66' itself, so that on heating and compressing with the compressing tools 72 and 74, the elastomer layers 82 and 84 as such remain unchanged, whilst the filling material 52 of the films 62' and 66' softens and during the compressing, is pressed and forced into the through openings 44 and the space regions 48, so that after the compression, the filling material 52 of the films 62' and 66' again forms the sealing surfaces 56' and 58', already lying against which, however, the elastomer layers 82 and 84 are provided and are available for a further sealing of surface regions to be sealed with the functional element.

Regarding the configuration of the threads 34 and 38, no detailed information has been given in relation to the first and second exemplary embodiments.

For example, the woven fabric 30 could be a woven fabric of metal threads 34 and 38.

However, it is also conceivable to produce the woven fabric 30 of threads 34 and 38 from plastics material, for example even thermoplastic material, provided it is ensured that the material of the threads 34 and 38 has a higher softening point than the material used as the filling material 52, for example, the thermoplastic material, from which the films 62 and 66 are made.

In this way, it is ensured, even on softening of the thermoplastic material of the films 62 and 66, that the structure of the threads 34 and 38 is retained, so that the threads 34 and 38 contribute substantially to the mechanical strength of the functional material layer even in this event.

Figure 7:
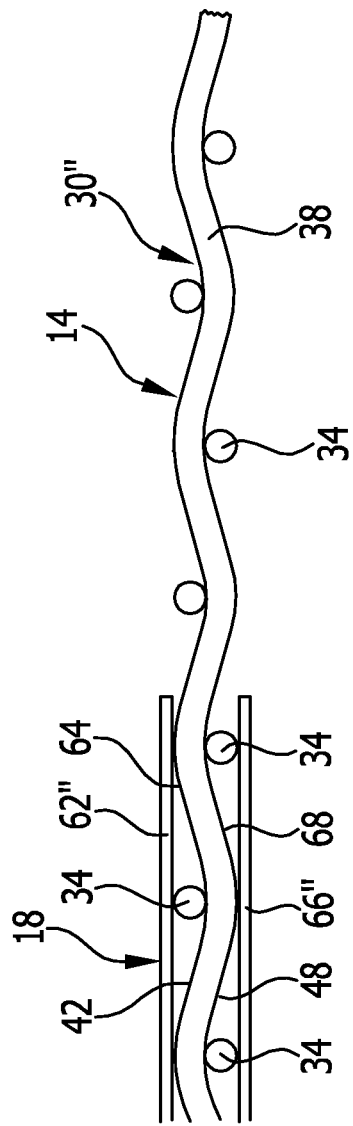
FIG. 7 shows a view similar to FIG. 4 of a third exemplary embodiment of the functional element according to the invention.
Figure 8:
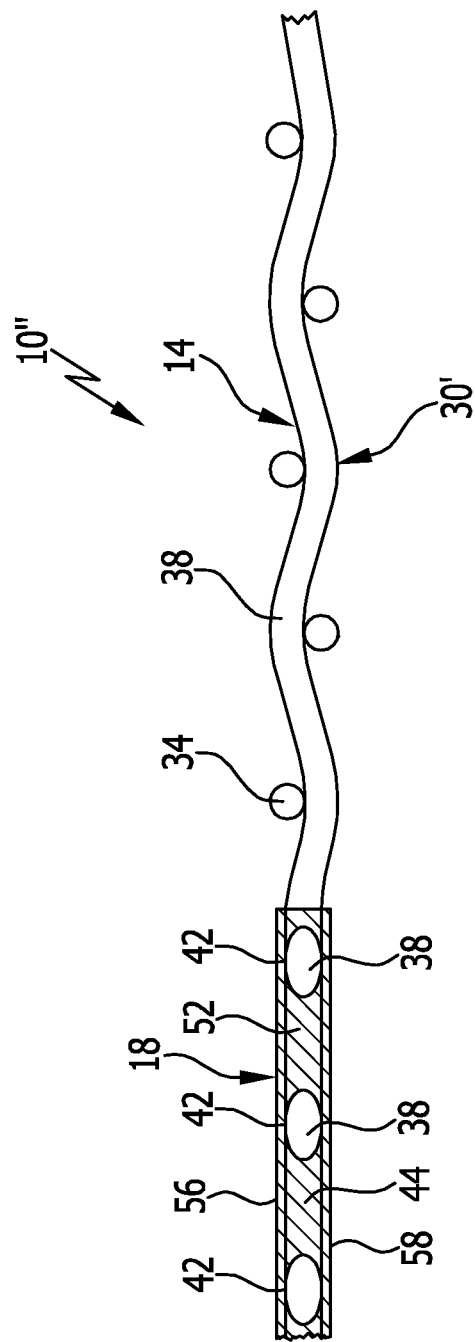
FIG. 8 shows a view similar to FIG. 3 of the third exemplary embodiment of the functional element according to the invention.

In a third exemplary embodiment of a functional element 10" according to the invention, shown in FIGS. 7 and 8, the threads 34 and 38 are made of a thermoplastic material which however, can be softened in the same manner as the thermoplastic material of the films 62" and 66".

If therefore, the film 62" and 66" is laid and compressed respectively on both sides, onto the sealing regions 18 of the woven or plaited fabric 30" that are to be produced, then on one side, pressing of the filling material of the film 62" and 66" into the through openings 44 takes place, although at the same time, a deformation of the threads 34 and 38 occurs, particularly in the region of the crossing sites 42 while flattening them, so that merely due to the flattening of the threads 34 and 38, the cross-sectional area of the through openings 44 is reduced and overall, thinner films 62" and 66" can be used in order to fill the through openings 44 and the space regions 48.

Figure 9:
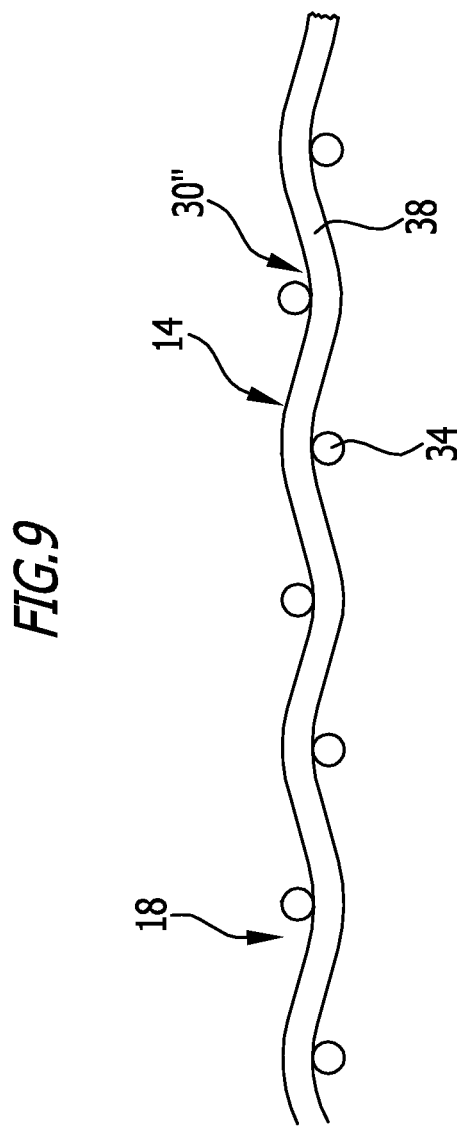
FIG. 9 shows a view similar to FIG. 4 of a fourth exemplary embodiment of a functional element according to the invention.
Figure 10:
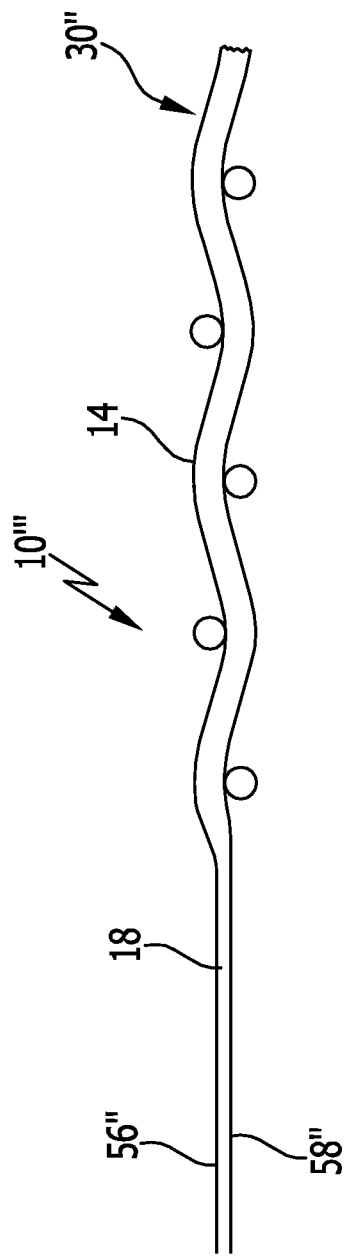
FIG. 10 shows a view similar to FIG. 3 of the fourth exemplary embodiment of the functional element according to the invention.

As shown in FIGS. 9 and 10, in a fourth exemplary embodiment of a functional element 10''' according to the invention, the threads 34 and 38 of the braided fabric 30" are made of a thermoplastic material.

In this exemplary embodiment, no additional filling material is used, but rather the thermoplastic material of the threads 34 and 38 is so strongly pressed in that, as shown in FIG. 10, a sealing region 18 arises in which the threads 34 and 38 are deformed so that their material forms a continuous and therefore cross-sectionally impermeable area which itself comprises the sealing surfaces 54" and 56".

These sealing surfaces 54" and 58" can themselves be applied directly on areas to be sealed or can be provided with sealing elements 22.

Figure 11:
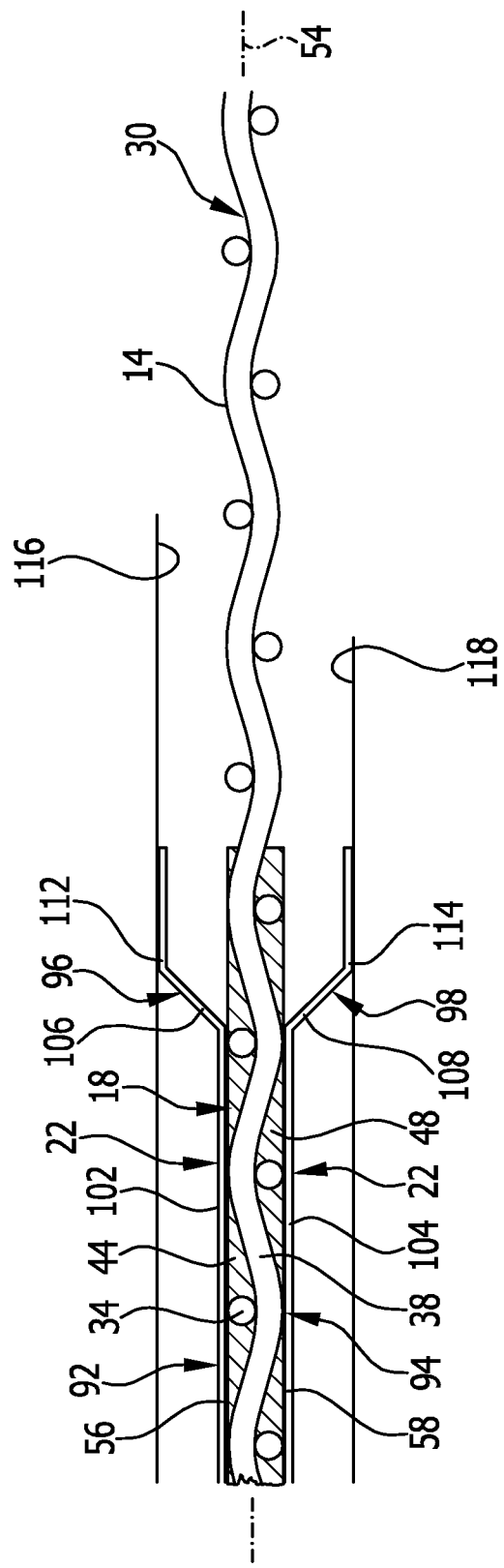
FIG. 11 shows a view of a fifth exemplary embodiment of a functional element according to the invention based on the first exemplary embodiment of the functional element according to the invention.

The sealing elements 22 which lie against the sealing surfaces 56 and 58 are herein not necessarily only formed as elastomer layers 82 and 84, but, in a fifth exemplary embodiment of a functional element according to the invention shown in FIG. 11, can also be configured as beaded sheets 92 and 94 of metal which have beads 96, 98, for example, close to a transition between the sealing region 18 and the sieve region 14 with which beads a sealing is possible, for example, against contact surfaces 116, 118 of a housing or a unit having fluid outlets and/or inlets.

Herein, the beaded sheets 92 and 94 have, for example, contact regions 102 and 104 with which they lie directly against the sealing surfaces 56 and 58, wherein starting from these contact regions 102 and 104, the beads 96 and 98 extend with their bead feet 106 and 108 away from the sealing surfaces 56 and 58 and each have bead ridges 112 and 114 which have a greater separation from the sealing surfaces 56 and 58 than the contact regions 102 and 104.

A combination of this type of a functional element 10 according to the invention with seal elements 22 as described, for example, in the second exemplary embodiment or in the fifth exemplary embodiment, can be used in particular as a flat seal, for example, as a flat gasket in cylinder heads or as a flat seal in the form of an intermediate plate between housing parts of fluid-powered control units.

Figure 12:
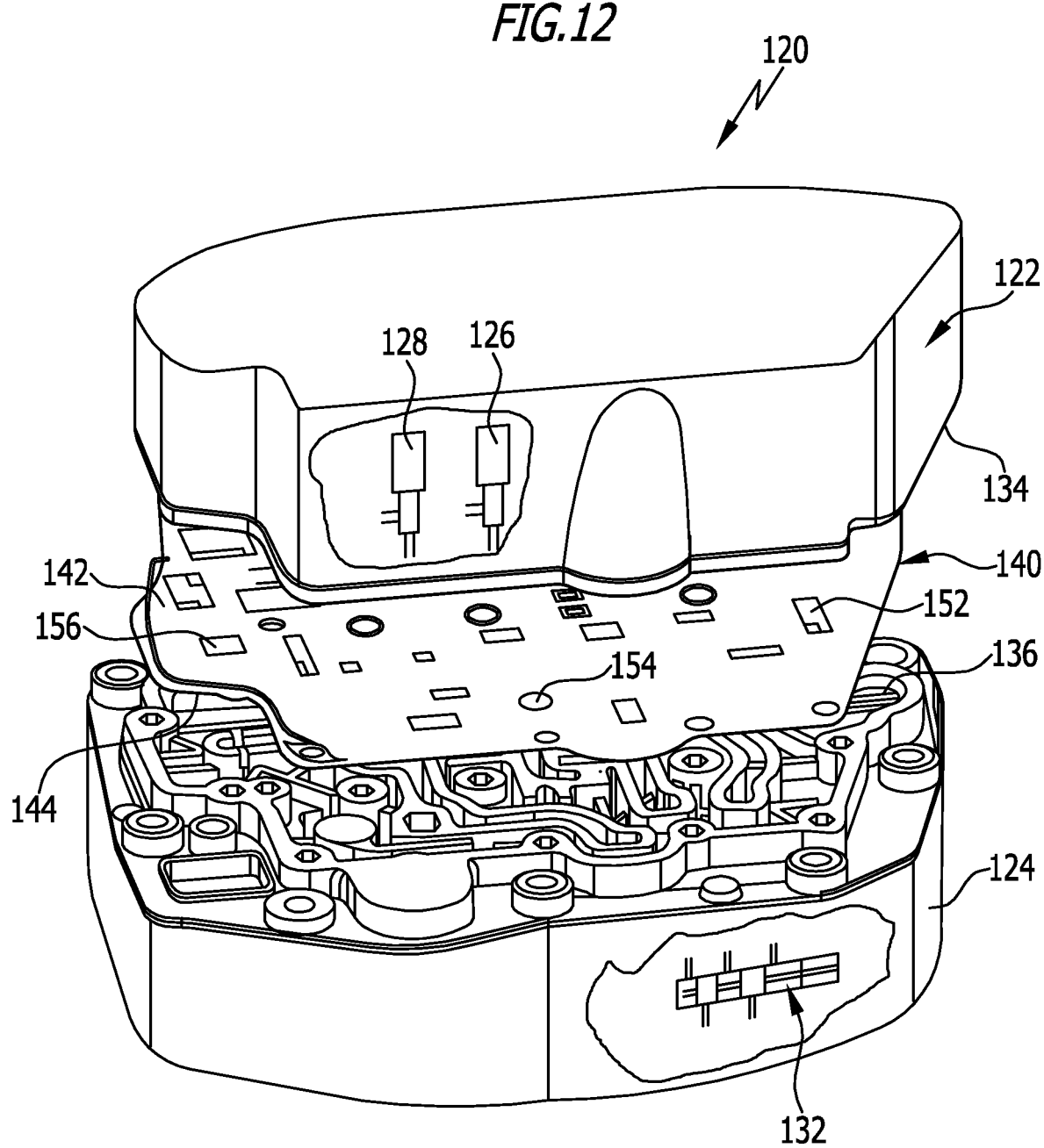
FIG. 12 shows a view of a control unit with an intermediate plate comprising a functional element according to the invention.

A control unit of this type identified as 120 is shown, for example, in FIG. 12 wherein it serves to control fluid-powered consuming units, for example, fluid-powered transmission units, in particular, transmission units for motor vehicles.

A control unit 120 of this type comprises, for example, a first housing part 122 which is produced, in particular from metal and a second housing part 124, also in particular, produced from metal, of which for example, the first housing part has valves 126 and 128 and the second housing part 124 has, for example, a slider 132 wherein these respectively control or regulate a flow of a fluid in the respective housing part 122 or 124.

The two housing parts 122, 124 have channel sides 134 and 136 which are configured so that the fluid can pass over from the one housing part 122, 124 into the respective other housing part 124, 126.

Inserted between these channel sides 134 and 136 of the housing parts 122, 124 is an intermediate plate identified overall as 140, which abuts the channel side 134 of the first housing part 122 with a first side 142 and abuts the channel side 136 of the second housing part 124 with a second side 144 and seals in each case with the channel sides 134 and 136, wherein passages in the intermediate plate 140, for example, the passages 152, 154 and 156 and possibly further passages are provided, through which a transfer of the fluid from one housing part 122, 124 into the other housing part 124, 122 takes place.

Herein, some of the passages, for example, the passages 152 and 156 enable unhindered transfer of the fluid from one housing part 122, 124 into the other housing part 124, 122 and additionally thereto, some of the passages, for example, the passage 154, serve as a functional element to influence the fluid transferring from one housing part 122, 124 into the other housing part 124, 122, wherein by means of a passage 154 of this type, for example, a specifically adaptable throttle effect can be achieved for controlling sequences, in particular temporal sequences in gear change processes.

Figure 13:
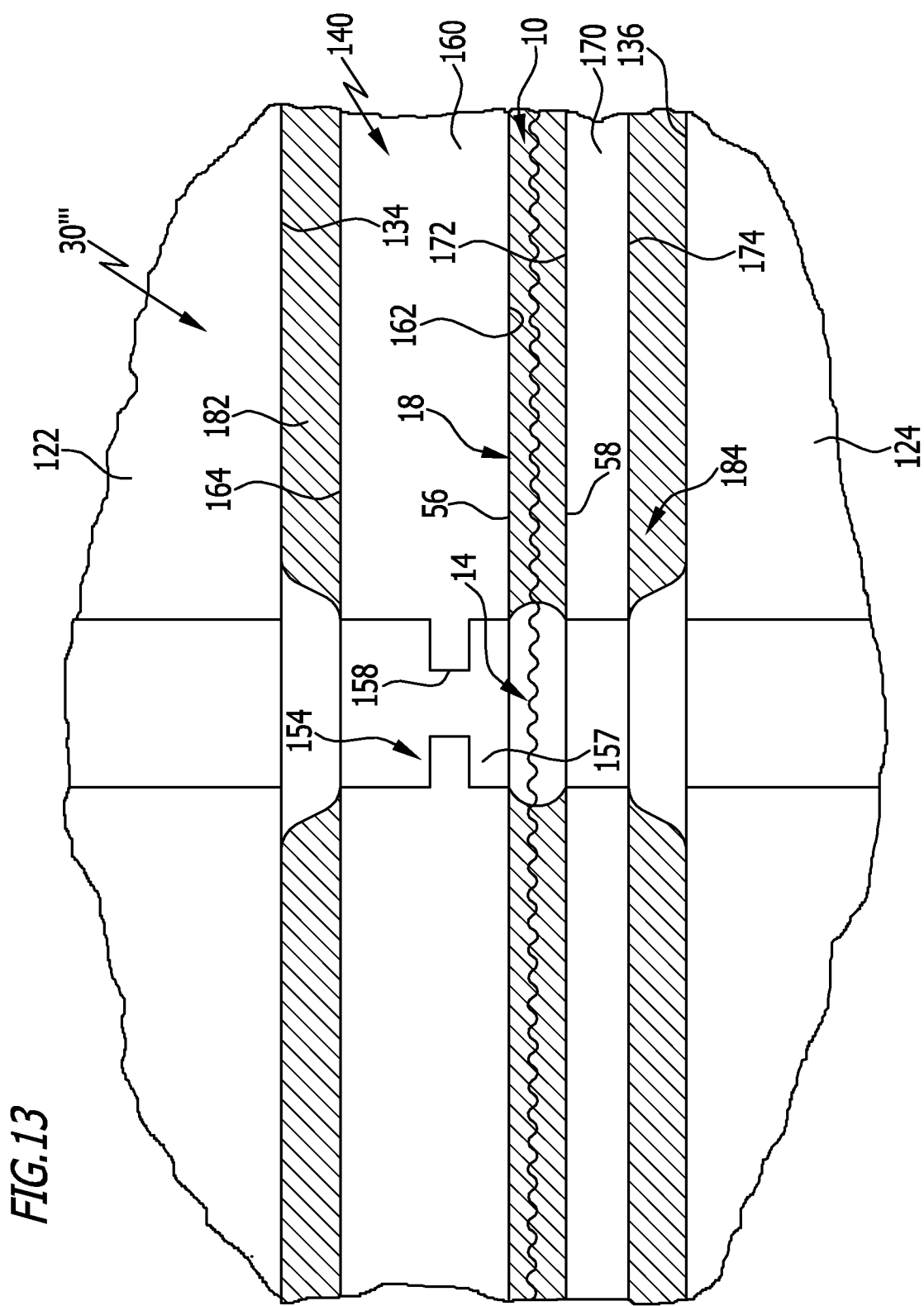
FIG. 13 shows a section through a first embodiment of the intermediate plate according to FIG. 12 with a functional element according to the invention integrated therein according to the first exemplary embodiment.

In the first embodiment of the intermediate plate 140 according to the invention shown in FIG. 13, the passage 154 is narrowed by the intermediate plate by means of a throttle opening 158 which is arranged in a central unit 160 of the intermediate plate 140.

The central unit 160 is formed, for example, by a metal plate.

Arranged on one side of the central unit 160 is, for example, a functional element 10 according to the invention in accordance with the first exemplary embodiment, wherein this abuts with its sealing surface 56 directly on a surface 162 of the central unit 160 representing a contact surface.

The opposite sealing surface 58 abuts a surface 172 of a further metal layer 170 representing a contact surface so that the functional element 10 according to the invention lies between two metal layers 160 and 170 of inelastic height and, due to the low surface roughnesses of the sealing surfaces 56 and 58, can seal therewith.

Furthermore, the functional element 10 is arranged so that the sieve region 14 is arranged overlapping with a recess 157 which transitions into the throttle opening 158 so that fluid can flow through the sieve region 14 to the throttle opening 158.

For example, a sealing of the intermediate plate 140 relative to the channel sides 134 and 136 of the housing parts 122, 124 takes place in that the central unit 160 bears a sealing element 182 on its surface 164 facing toward the channel side 134 and the intermediate layer 170 bears on its surface 174 facing toward the channel side 136 a seal element 184, wherein the seal elements 182 and 184 can be formed either as elastomer layers or as metallic seal elements, for example with beads.

Figure 14:
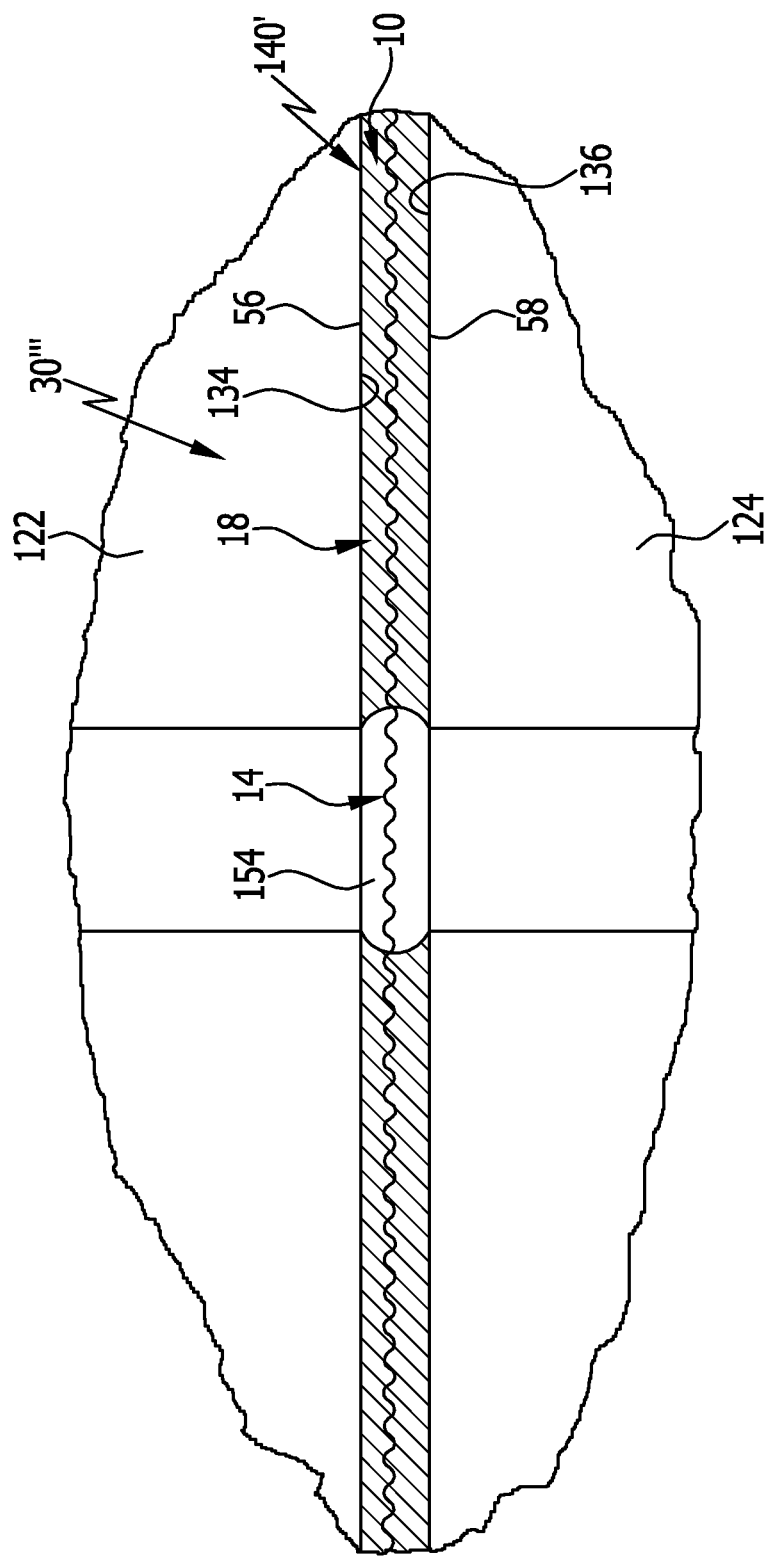
FIG. 14 shows a section through a second embodiment of the intermediate plate according to FIG. 12, formed from a functional element according to the first exemplary embodiment.

In a second embodiment of the intermediate plate 140' shown in FIG. 14, it is formed solely by the functional element 10 according to the first exemplary embodiment which directly abuts the channel sides 134 and 136 with its sealing surfaces 56, 58.

Due to the low surface roughness of, for example, less than 10 μm, a direct sealing to the channel sides 134 and 136 formed to be of inelastic height is possible, wherein preferably the housing parts 122, 124 are connected to one another so that the channel sides 134 and 136 abut the sealing surfaces 56, 58 with a surface pressure of at least 0.1 MPa (megapascal).

The invention claimed is:

1. A functional element for flat seals, comprising:
a functional material layer with flat outer sealing surfaces and a sieve region in which through openings for the passage of a fluid are arranged lying exposed between threads of a woven or plaited fabric, the woven or plaited fabric extending at least in the sieve region and between the flat outer sealing surfaces;
wherein, in a sealing region formed to be cross-sectionally impermeable, the through openings of the woven or plaited fabric are filled by a compressed filling material and are thereby closed;
wherein the filling material closing the through openings includes a layer or film of supplemental filling material, supplemental to the woven or plaited fabric, pressed into the woven or plaited fabric, the compressed filling material closing the through openings of the woven or plaited fabric and filling spatial regions of the woven or plaited fabric adjoining the threads.

2. Functional element according to claim 1, wherein the filling material comprises material of the threads.

3. Functional element according to claim 1, wherein the filling material permeates the through openings.

4. Functional element according to claim 1, wherein, on both sides of the woven or plaited fabric, the filling material is pressed into the woven or plaited fabric forming the flat outer sealing surfaces suitable for sealing against a contact surface.

5. Functional element according to claim 4, wherein the respective flat outer sealing surfaces are configured for sealing against a contact surface of an inelastic assembly.

6. Functional element according to claim 1, wherein the compressed filling material is a thermoplastic material.

7. Functional element according to claim 1, wherein the threads have a thread thickness of not more than 300 μm.

8. Functional element according to claim 1, wherein the woven or plaited fabric is formed from plastic threads.

9. Functional element according to claim 8, wherein the woven or plaited fabric has threads of thermoplastic material, wherein the thermoplastic material of the threads is at least partially compressed as filling material to close the through openings.

10. Functional element according to claim 1, wherein the functional material layer is formed by a woven or plaited fabric of threads the melting point of which lies so far above the melting point of the filling material, wherein the filling material is a thermoplastic material applied onto the threads, that the applied thermoplastic material is disposed in the through openings of the threads of unchanged form.

11. Functional element according to claim 4, wherein a sealing element is arranged on at least one of the flat outer sealing surfaces.

12. Functional element according to claim 4, wherein a sealing element of elastomer material is arranged on at least one of the flat outer sealing surfaces.

13. Functional element according to claim 12, wherein the elastomer material has a softening temperature which is so far above a softening temperature of the filling material that the sealing element is of unchanged form following a thermal softening of the filling material.

14. Functional element according to claim 4, wherein at least one of the flat outer sealing surfaces is provided with a sealing element having at least one layer made of a metallic flat material.

15. Functional element according to claim 14, wherein the at least one layer made of a metallic flat material is provided with a bead or an elastomer support.

16. Functional element according to claim 1, wherein the filling material is pressed into the woven or plaited fabric such that the filling material forms a sealing surface on a side of the woven or plaited fabric opposite to the side on which the filling material is pressed into the woven or plaited fabric.

17. Functional element according to claim 1, wherein at least one of the flat outer sealing surfaces is provided as a sealing element with at least one metallic layer.

18. Functional element according to claim 17, wherein the at least one metallic layer has a height that serves to seal the gap between the sealing surface and the locating side of an assembly.

19. Functional element according to claim 1, wherein the sealing region surrounds the sieve region within the functional material layer.

20. Functional element according to claim 1, wherein the woven or plaited fabric extends throughout the entire functional material layer.

21. Functional element according to claim 1, wherein the flat outer sealing surfaces are formed from the woven or plaited fabric and the supplemental filling material.

22. Functional element according to claim 1, wherein the sealing region comprises the flat outer sealing surfaces where the compressed filling material is pressed into the woven or plaited fabric.

23. Functional element according to claim 1, wherein the flat outer sealing surfaces are at least partly formed by the woven or plaited fabric and the supplemental filling material pressed into the woven or plaited fabric.

24. Functional element according to claim 1, wherein the supplemental filling material is a thermoplastic material.

25. Functional element according to claim 24, wherein the woven or plaited fabric includes threads made from thermoplastic material.

* * * * *